United States Patent
Wong et al.

(10) Patent No.: US 12,075,397 B2
(45) Date of Patent: *Aug. 27, 2024

(54) TELECOMMUNICATIONS APPARATUS AND METHODS

(71) Applicants: Sony Group Corporation, Tokyo (JP); Sony Mobile Communications Inc., Tokyo (JP)

(72) Inventors: Shin Horng Wong, Basingstoke (GB); Martin Warwick Beale, Basingstoke (GB); Basuki Priyanto, Lund (SE)

(73) Assignees: SONY GROUP CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,853

(22) Filed: Nov. 16, 2022

(65) Prior Publication Data

US 2023/0098489 A1    Mar. 30, 2023

Related U.S. Application Data

(63) Continuation of application No. 16/969,990, filed as application No. PCT/EP2019/053688 on Feb. 14, 2019, now Pat. No. 11,523,392.

(30) Foreign Application Priority Data

Feb. 16, 2018 (EP) .................................. 18157251

(51) Int. Cl.
*H04W 72/0453* (2023.01)
*H04W 72/23* (2023.01)
*H04W 74/0833* (2024.01)

(52) U.S. Cl.
CPC ....... *H04W 72/0453* (2013.01); *H04W 72/23* (2023.01); *H04W 74/0833* (2013.01)

(58) Field of Classification Search
CPC .......... H04W 72/0453; H04W 72/042; H04W 74/0833
See application file for complete search history.

(56) References Cited

U.S. PATENT DOCUMENTS

| 2016/0105891 A1 | 4/2016 | Li et al. |
| 2018/0062699 A1 | 3/2018 | Horiuchi et al. |

(Continued)

FOREIGN PATENT DOCUMENTS

| CN | 106961734 A | 7/2017 |
| CN | 107079438 A | 8/2017 |
| WO | 2017/017880 A1 | 2/2017 |

OTHER PUBLICATIONS

International Search Report and Written Opinion mailed on May 2, 2019 for PCT/EP2019/053688 filed on Feb. 14, 2019, 12 pages.

(Continued)

*Primary Examiner* — Chi Ho A Lee
(74) *Attorney, Agent, or Firm* — XSENSUS LLP

(57) ABSTRACT

A method of operating a terminal device to communicate with a network infrastructure equipment in a wireless telecommunications system using radio resources comprising a narrowband carrier supported within a wider system frequency bandwidth of the wireless telecommunications system, wherein the method comprises: establishing initial frequencies for radio resources comprising the narrowband carrier; receiving configuration signalling from the network infrastructure equipment providing an indication of a frequency shift to apply to the initial frequencies for the radio resources comprising the narrowband carrier; establishing shifted frequencies for the radio resources comprising the narrowband carrier by applying the indicated frequency shift (Continued)

to the initial frequencies; and communicating with the network infrastructure equipment using the radio resources for the narrowband carrier with the shifted frequencies.

18 Claims, 8 Drawing Sheets

(56) References Cited

U.S. PATENT DOCUMENTS

| | | |
|---|---|---|
| 2018/0098346 A1 | 4/2018 | Liu et al. |
| 2018/0124752 A1 | 5/2018 | Takeda et al. |
| 2018/0217228 A1 | 8/2018 | Edge et al. |
| 2018/0242179 A1 | 8/2018 | Rathonyi et al. |
| 2018/0317231 A1 | 11/2018 | Wang et al. |
| 2019/0013985 A1* | 1/2019 | Takeda ............... H04W 56/00 |
| 2019/0029005 A1 | 1/2019 | Bendlin et al. |
| 2019/0229867 A1 | 7/2019 | Yi et al. |
| 2019/0246254 A1 | 8/2019 | Chatterjee et al. |
| 2019/0260530 A1* | 8/2019 | Yi ............................. H04L 5/001 |
| 2019/0349734 A1 | 11/2019 | Sui et al. |
| 2020/0053546 A1 | 2/2020 | Panchal et al. |
| 2020/0154486 A1* | 5/2020 | Cheng ................... H04L 1/08 |
| 2020/0187256 A1* | 6/2020 | Lim ..................... H04L 5/0048 |
| 2020/0213985 A1* | 7/2020 | Baldemair ........... H04L 5/0053 |
| 2020/0228265 A1* | 7/2020 | Wang ................... H04L 5/0044 |
| 2020/0274667 A1* | 8/2020 | Kim ..................... H04L 5/0048 |
| 2021/0144641 A1 | 5/2021 | Sun et al. |

OTHER PUBLICATIONS

Ericsson and Qualcomm, "New WID on Even further enhanced MTC for LTE," 3GPP TSG RAN Meeting No. 75, RP-170732, (Revision of RP-170465), Dubrovnik, Croatia, Mar. 6-9, 2017, 4 pages.

Ericsson, "Flexible PDSCH/PUSCH resource allocation for MTC," 3GPP TSG-RAN WG1 Meeting No. 91bis, R1-1717001, Prague, Czech Republic, Oct. 9-13, 2017, pp. 1-7.

Ericsson, "Revised WID for Further Enhanced MTC for LTE," 3GPP TSG RAN Meeting No. 73, RP-161464, Revision of RP-161321, New Orleans, USA, Sep. 19-22, 2016, 6 pages.

Holma, H. and Toskala, A., "System Architecture Based on 3GPP SAE," LTE for UMTS-OFDMA and SC-FDMA Based Radio Access, John Wiley & Sons, Ltd., 2009, pp. 25-27.

Huawei and Hisilicon, "Revised work item proposal: Enhancements of NB-IoT," 3GPP TSG RAN Meeting No. 73, RP-161901, Revision of RP-161324, New Orleans, USA, Sep. 19-22, 2016, 8 pages.

Huawei, et al., "New WID on Further NB-IoT enhancements," 3GPP TSG RAN Meeting No. 75, RP-170852, Dubrovnik, Croatia, Mar. 6-9, 2017, 6 pages.

Orange, "On the interest of more flexible resource allocation for efeMTC," 3GPP TSG-RAN WG1 Meeting No. 91, R1-1720541, Reno, Nevada, USA, Nov. 27-Dec. 1, 2017, pp. 1-4.

Panasonic, "MTC Narrowband definition and collision handling," 3GPP TSG RAN WG1 Meeting No. 82, R1-153960, Beijing, China, Aug. 24-28, 2015, pp. 1-6.

* cited by examiner

TELECOMMUNICATIONS APPARATUS AND METHODS

CROSS-REFERENCE TO RELATED APPLICATIONS

The present application is a continuation of U.S. application Ser. No. 16/969,990, filed Aug. 14, 2020, which is based on PCT filing PCT/EP2019/053688, filed Feb. 14, 2019, which claims priority to EP 18157251.2, filed Feb. 16, 2018, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data-rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things", or IoT for short. The 3GPP has proposed in Release 13 of the 3GPP specifications to develop technologies for supporting narrowband (NB)-IoT and so-called enhanced MTC (eMTC) operation using an LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data, and as such may be configured to operate on a restricted (narrower) baseband bandwidth as compared to other terminal devices operating in a network.

The increasing use of different types of terminal devices associated with different operating bandwidths gives rise to new challenges for efficiently handling communications in wireless telecommunications systems that need to be addressed.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
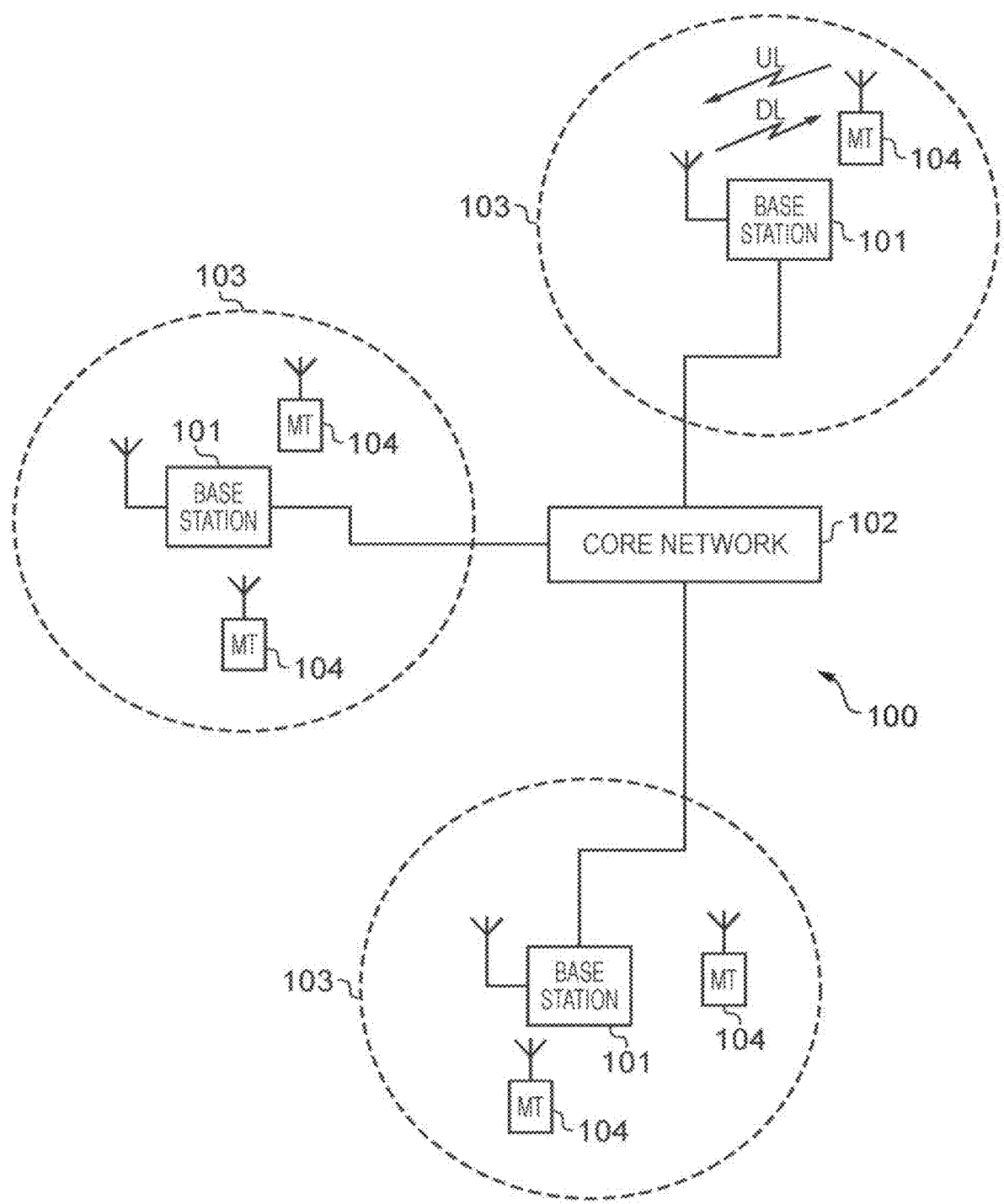
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink (DL). Data is transmitted from terminal devices 104 to the base stations 101 via a radio uplink (UL). The core network 102 routes data to and from the terminal devices 104 via the respective base stations 101 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

While certain embodiments may be generally described herein in relation to the network architecture represented in FIG. 1, it will be appreciated corresponding approaches may equally be adopted in networks conforming to other overall configurations, for example configurations associated with proposed approaches for new radio access technology (RAT), NR, wireless mobile telecommunications networks/systems. A new RAT network may comprise communication cells that each comprise a controlling node in communication with a core network component and a plurality of distributed units (radio access nodes/remote transmission and reception points (TRPs)) within the cell. The distributed units may be responsible for providing the radio access interface for terminal devices connected to the NR network. Each distributed unit has a coverage area (radio access footprint) which together with each other define the coverage of the communication cell. Each distributed unit includes transceiver circuitry for transmission and reception of wireless signals and processor circuitry configured to control the respective distributed units. In terms of broad top-level functionality, the core network component of such a new RAT telecommunications system may be broadly considered to correspond with the core network 102 represented in FIG. 1, and the respective controlling nodes and their associated distributed units/TRPs may be broadly considered to provide functionality corresponding to the base stations of FIG. 1. Thus, the term network infrastructure equipment/access node may be used to encompass these elements and more conventional base-station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs. A terminal device operating in this proposed new RAT architecture may thus exchange signalling with a first controlling node via one or more of the distributed units associated with the controlling node. In some implementations the involvement of the distributed units in routing communications from the terminal device to a controlling node (controlling unit) may be transparent to the terminal device. It will further be appreciated this example represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architecture shown in FIG. 1. It will be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node and/or a TRP in a new RAT architecture of the kind discussed above.

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED), and other RRC modes/states may also be supported. A terminal device in the idle mode may move to connected mode, for example because it needs to transmit uplink data or respond to a paging request, by undertaking a random access procedure, and a terminal device in the connected mode may move to the idle mode, for example because it has finished a current exchange of higher layer user plane data with the network, by undertaking an RRC connection release procedure. Radio Resource Control signalling is signalling exchanged between a terminal device and a network in support of the different RRC modes to control how radio resources are used/managed in the network. Examples of RRC signalling include signalling associated with RRC connection establishment and release functions, broadcast of system information (e.g. system information blocks, SIBs), radio bearer establishment, reconfiguration and release, RRC connection mobility procedures, paging notification and release and outer loop power control. In general, RRC signalling may be considered to be signalling/messages between network infrastructure equipment (eNB/base station) and terminal devices (UE) at Layer 3 (radio link control layer) in the radio network protocol stack. Typically RRC signalling is used for configuration for operations of features in a UE which are semi-static (i.e. the configuration will be used until another RRC message updates the configuration). RRC signalling can be communicated/broadcast in system information, e.g. SIB in an LTE context, or may be UE specific.

As noted above, it is proposed for wireless telecommunications systems to support some terminal devices, for example, Internet of Things (IoT) type terminal devices and Machine Type Communications devices (MTC) on a narrowband carrier operating within a wider system (host) frequency bandwidth. A terminal device configured to operate using a restricted subset of radio resources (narrowband carrier) spanning a host frequency bandwidth (host carrier) in this way may, for convenience of terminology, sometimes be referred to herein as a narrowband (NB) terminal device while a terminal device able to operate using the full host frequency bandwidth may, for convenience of terminology, sometimes be referred to herein as a legacy or non-narrowband terminal device. In this regard it will be appreciated the term "legacy" is used here simply to help distinguish between narrowband and non-narrowband terminal devices. The term is not to be interpreted as indicating such terminal devices are in any way outdated, but merely to indicate that they are configured to operate over the full operating bandwidth of the wireless telecommunications system in the usual/conventional way rather than being configured to operate within a restricted narrowband within the full operating bandwidth of the wireless telecommunications system.

Wireless telecommunications systems may have a range of different system bandwidths. For example, in an LTE context a system may have an overall operating bandwidth (system BW) of 1.4 MHz, 3 MHz, 5 MHz, 10 MHz, 15 MHz or 20 MHz. Radio resources are divided in frequency into subcarriers (which in LTE have a 15 kHz channel spacing) with 12 subcarriers corresponding to a physical resource block, PRB (in LTE a PRB has a time duration of 0.5 ms (half a subframe)). In the frequency domain/dimension the number of PRBs for a carrier depends on the system bandwidth as indicated in the first and second columns in Table 1.

TABLE 1

| System Bandwidth (MHz) | System Bandwidth (PRBs) | Number of 1.4 MHz Narrowband carriers | RBG size (NRB) |
| --- | --- | --- | --- |
| 1.4 MHz | 6 | 1 | 1 |
| 3 MHz | 15 | 2 | 2 |
| 5 MHz | 25 | 4 | 2 |
| 10 MHz | 50 | 8 | 3 |
| 15 MHz | 75 | 12 | 4 |
| 20 MHz | 100 | 16 | 4 |

One approach for narrowband/small bandwidth operation in an LTE context is to use narrowbands with a bandwidth of 6 PRBs (i.e. 6×12=72 subcarriers) corresponding to a 1.4 MHz carrier (72 subcarriers with a 15 kHz spacing corresponds to 1.08 MHz but additional bandwidth is used for filtering, signal roll-off, etc.). Because the narrowband carrier bandwidth for an NB terminal device (1.4 MHz) is smaller than the maximum carrier bandwidth that a legacy terminal device must support (20 MHz in LTE), the NB terminal device can use a less complex transceiver (RF front end), which can help reduce manufacturing costs and power consumption during use. A system bandwidth may be wide enough to support multiple non-overlapping narrowband carriers at different frequency locations across the system bandwidth. For example, in an LTE context, all but the smallest system bandwidth (1.4 MHz) has the potential to support more than one 6 PRB wide narrowband. The potential number of different narrowbands for each system bandwidth in LTE is indicated in the third column in Table 1. The frequency locations for the narrowbands within a system frequency bandwidth may be fixed (e.g. predefined by an operating standard for the wireless telecommunications system).

In the general case the number of PRBs in a system bandwidth will not be an integer multiple of the number of PRBs in a narrowband. For example, with the exception of the smallest 1.4 MHz system bandwidth in LTE, dividing the total number of PRBs in the system bandwidth (second column in Table 1) into the number of potential narrowbands that can be supported (second column in Table 1) leaves some PRBs remaining (which may be referred to here as remaining PRBs). As noted above, the frequency locations for the narrowbands within a system frequency bandwidth may be predefined, and in an LTE context this is done in such a way that the narrowband locations and the remaining PRBs are both arranged symmetrically about the centre of the system bandwidth. For LTE the remaining PRBs are distributed such that if there is an even number of remaining PRBs they are located in equal numbers at the upper and lower ends of the system bandwidth. If there is an odd number of remaining PRBs, one is located at the centre of the system frequency bandwidth and any others are located in equal numbers at the upper and lower ends of the system bandwidth. The narrowbands are arranged contiguously between the remaining PRBs.

Figure 2:
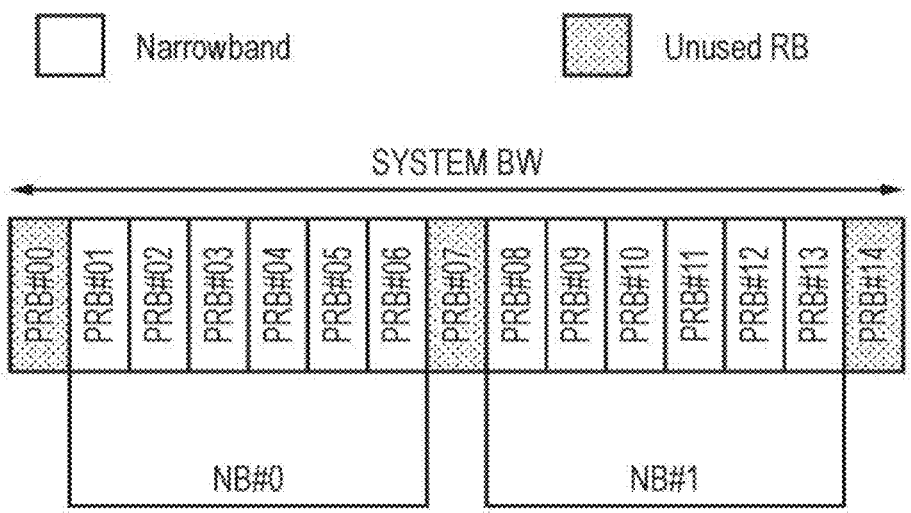
FIG. 2 schematically represents an arrangement of physical resource blocks (PRBs) that span a system bandwidth (BW) to support two narrowband (NB) carriers in a wireless telecommunication system.

FIG. 2 schematically shows narrowband and remaining PRB locations arranged according to these principles for the example of a 3 MHz/15 PRB system bandwidth (System BW). Thus FIG. 2 schematically shows the 15 PRBs (labelled PRB #00, PRB #01, . . . , PRB #14) arranged in frequency from a lower end of the system bandwidth to an upper end of the system bandwidth (left to right in the figure). The 15 PRBs can support two 6 PRB narrowbands, labelled NB #0 and NB #1 in FIG. 2, with 3 PRBs remaining. The PRBs allocated to support narrowband operation are shown with no shading while the remaining PRBs (i.e. PRBs not allocated to support narrowband operation for this particular arrangement) are shown with shading. It will be appreciated that references herein to certain PRBs supporting narrowband operation are intended to mean these are the PRBs that may be used to support narrowband operation if desired, and at other times they may be used to support legacy/non-narrowband operation. That is to say the PRBs shown in the figures as being associated with narrowband operation indicate the potential narrowband locations supported within the system bandwidth. Whether any particular narrowband is active/scheduled for use at any given time (i.e. the corresponding PRBs are used for narrowband operation) or not currently active (i.e. the corresponding PRBs are free to be used for non-narrowband/legacy operation) may be determined in accordance with the general established principles for scheduling (i.e. allocating resources to) narrowband operation in a wireless telecommunications system.

Thus for the arrangement of FIG. 2 there are three remaining PRBs (i.e. PRBs not used to support any narrowband), and so one is located in the middle of the system frequency band (PRB #07) and one is located at each end of the system frequency band (PRB #00 and PRB #14). A first narrowband, NB #0, is formed using {PRB #01, PRB #02, PRB #03, PRB #04, PRB #05, PRB #06} and a second narrowband, NB #1, is formed using {PRB #08, PRB #09, PRB #10, PRB #11, PRB #12, PRB #13}.

It is common for PRBs in wireless telecommunications system to be divided into a plurality of predefined groups of physical resource blocks (i.e. resource block groups, RBGs) which are scheduled together. For example, in LTE, the resource allocation on the physical downlink shared channel (PDSCH) typically uses what is known as Resource Allocation Type 0. For this the system bandwidth is divided into Resource Block Groups (RBGs) consisting of $N_{RB}$ PRBs (if the number of PRBs for the system bandwidth is not an integer multiple of $N_{RB}$ the leftover PRBs may form a final RBG with fewer than $N_{RB}$ PRBs). An RBG is the granularity of resource allocation for PDSCH (i.e. the smallest allocation that can be made), i.e. the downlink resources are allocated in numbers of RBGs for the terminal device. This restriction helps provide a balance between scheduling flexibility and control signalling overhead. For LTE the value $N_{RB}$ is dependent upon the system bandwidth and is indicated in the fourth column in Table 1.

Figure 3:
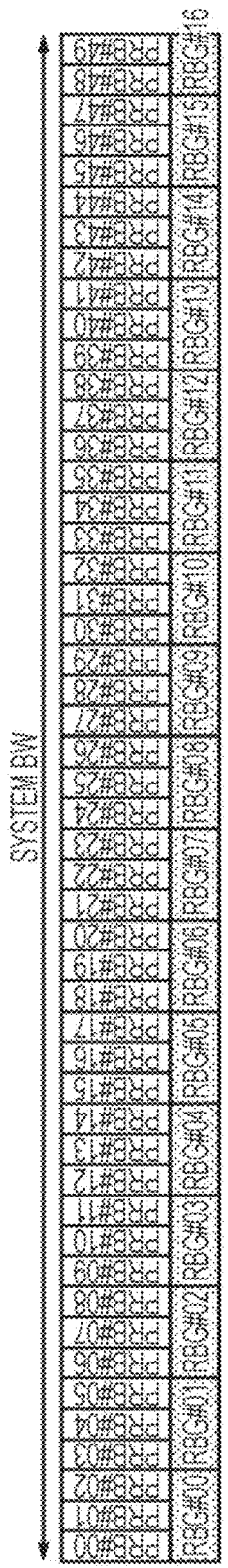
FIG. 3 schematically represents an arrangement of PRBs that span a system BW and which are grouped into physical resource block groups (RBGs) in a wireless telecommunication system.

FIG. 3 schematically shows a known arrangement of RBGs for the example of an LTE 10 MHz/50 PRB system bandwidth (System BW). Thus FIG. 3 schematically shows the 50 PRBs (labelled PRB #00, PRB #01, . . . , PRB #49) arranged in frequency from a lower end of the system bandwidth to an upper end of the system bandwidth (left to right in the figure). As indicated in Table 1, for this system bandwidth the RBG size $N_{RB}$ is 3 PRB so the 50 PRBs can support sixteen 3-PRB RBGs (labelled RBG #00, RBG #01, . . . , RBG #15) and one 2 PRB RBG (labelled RBG #16), i.e. a total of 17 RBG.

Figure 4:
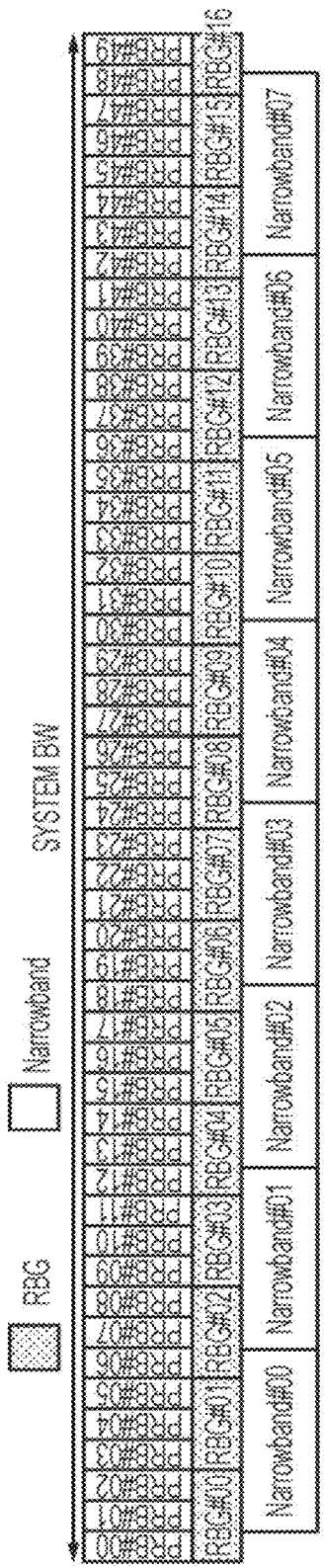
FIG. 4 schematically represents an arrangement of PRBs spanning a system BW and which are grouped into RBGs and which support a plurality of NB carriers in a wireless telecommunication system.

FIG. 4 is similar to, and will be understood from FIG. 3, but in addition to showing how the system bandwidth BW (again 10 MHz for this example) is divided into 50 physical resource blocks (PRB #00, PRB #01, . . . , PRB #49) which are grouped into 17 resource block groups (RBG #00, RBG #01, . . . , RBG #16), FIG. 4 also schematically shows the predefined locations for the eight 6 PRB wide narrowbands supported for this system bandwidth in LTE in accordance with the principles set out above for locating narrowbands. Thus, the eight narrowbands (labelled Narrowband #00, Narrowband #01, . . . , Narrowband #07) are contiguously arranged in frequency with Narrowband #00 on physical resource blocks PRB #01 to PRB #06, Narrowband #01 on physical resource blocks PRB #07 to PRB #12, and so on up to Narrowband #07 on physical resource blocks PRB #43 to PRB #48. There are two remaining physical resource blocks, namely PRB #00 and PRB #49, that are not allocated to support any of the narrowbands and these are located at the end of the frequency bandwidth BW.

For the arrangement represented in FIG. 4, which is in accordance with the currently proposed approaches for LTE, it has been observed that the narrowbands, NBs, and resource block groups, RBGs, are not well aligned in frequency [6], i.e. the narrowbands and RBG do not start or end with the same PRB. A consequence of this nonalignment of the boundaries for the narrowbands with boundaries for the resource block groups is a reduced capacity for the system as a whole, which can be seen from FIG. 5.

Figure 5:
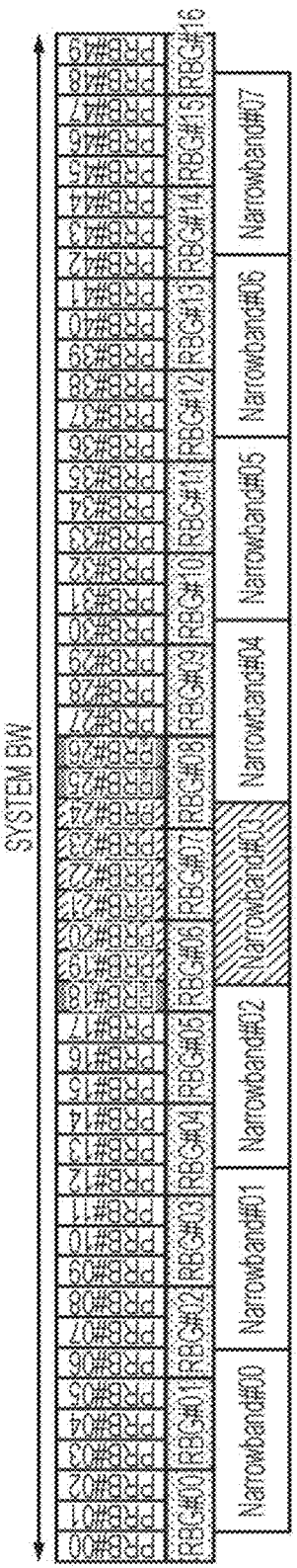
FIG. 5 schematically represents an arrangement of PRBs spanning a system BW and which are grouped into RBGs and which support a plurality of NB carriers in a wireless telecommunication system with one of the NB carriers being scheduled for use.

FIG. 5 is similar to, and will be understood from FIG. 4 and again shows how a 10 MHz LTE system bandwidth BW is divided into 50 physical resource blocks (PRB #00, PRB #01, . . . , PRB #49) which are grouped into 17 resource block groups (RBG #00, RBG #01, . . . , RBG #16) and also how the predefined locations for the 8 narrowbands (Narrowband #00, Narrowband #01, . . . , Narrowband #07) supported for this system bandwidth in LTE are arranged in frequency. FIG. 5 further represents a specific operating scenario in which one of the narrowbands (in this example Narrowband #03 on PRB #19 to PRB #24) is scheduled for use—i.e. the radio resources PRB #19 to PRB #24 are currently in use to support NB operation, but the other radio resources (PRB #00 to PRB #18 and PRB #25 to PRB #49) are not currently needed to support NB operation. Of course it will be appreciated this is simply one example implementation scenario, in other scenarios different narrowbands may be currently scheduled/active according to traffic needs as determined in accordance with the conventional approaches for scheduling in wireless telecommunications systems supporting narrowband operation.

As can be seen in FIG. 5, the scheduled narrowband (Narrowband #03) is on physical resource blocks (PRB #19 to PRB #24) which are spread across three resource block groups (RBG #06 to RBG #08). The RBGs which are not used to support the scheduled narrowband (i.e. RBG #00 to RBG #05 and RBG #09 to RBG #16), or any other currently scheduled narrowband(s), can be used to support other communications in the system, e.g. for communicating with legacy/non-narrowband terminal devices (assuming these RBGs are not being used to support other currently-scheduled narrowband(s)). However, because of the miss-alignment in the NB and RBG boundaries there are some PRBs which are not used for supporting the scheduled narrowband but which nonetheless cannot be used to support legacy operation because they are in an RBG containing PRBs which are needed to support the scheduled NB, remembering the legacy operation can only schedule resources at the granularity of an RBG. Thus, for the implementation example represented in FIG. 5 the radio resources comprising PRB #18, PRB #25 and PRB #26 are in effect blocked for use by legacy terminal devices. This leads to a degradation in the cell's throughput/spectral efficiency.

The inventors have recognised that shifting the narrowband locations relative to the RBG boundaries can help to mitigate this issue by reducing the number of RBGs that include PRBs used to support individual narrowbands. Also, the inventors have recognised that redefining the fixed narrowband locations would potentially cause misalignment with narrowband locations for older narrowband terminal devices operating according to previous releases of narrowband-capable terminal device standards (i.e. Rel-13 and Rel-14 in an LTE context), and so a semi-static or dynamic approach in shifting the narrowbands would give the flexibility to the network to manage these resources. For example if there are not many legacy (LTE) UEs then there is no need to shift any narrowbands.

Thus in accordance with certain embodiments of the disclosure it is proposed to retain predefined locations (i.e. what might be referred to as initial locations/initial frequencies for radio resources comprising the narrowband carriers) for narrowband carriers but to provide a procedure for moving/shifting the predefined locations to new locations (i.e. to provide what might be referred to as shifted frequencies for the radio resources comprising the narrowband carriers). Thus a semi-static or dynamic approach to shifting the narrowbands can be used to provide flexibility in a network for managing these resources. For example, in accordance with some approaches an indication of a shift to apply to a predefined/initial set of frequencies for a narrowband carrier may be signalled from a base station (network entity) to a terminal device, for example in RRC signalling as system information in a system information block, SIB, or UE (terminal device) specific signalling to indicate frequency shift(s) for the narrowband(s), which may sometimes be referred to herein as a shift pattern. The shift pattern may thus inform the UE of the number of PRBs for which to shift the narrowband(s).

Figure 6:
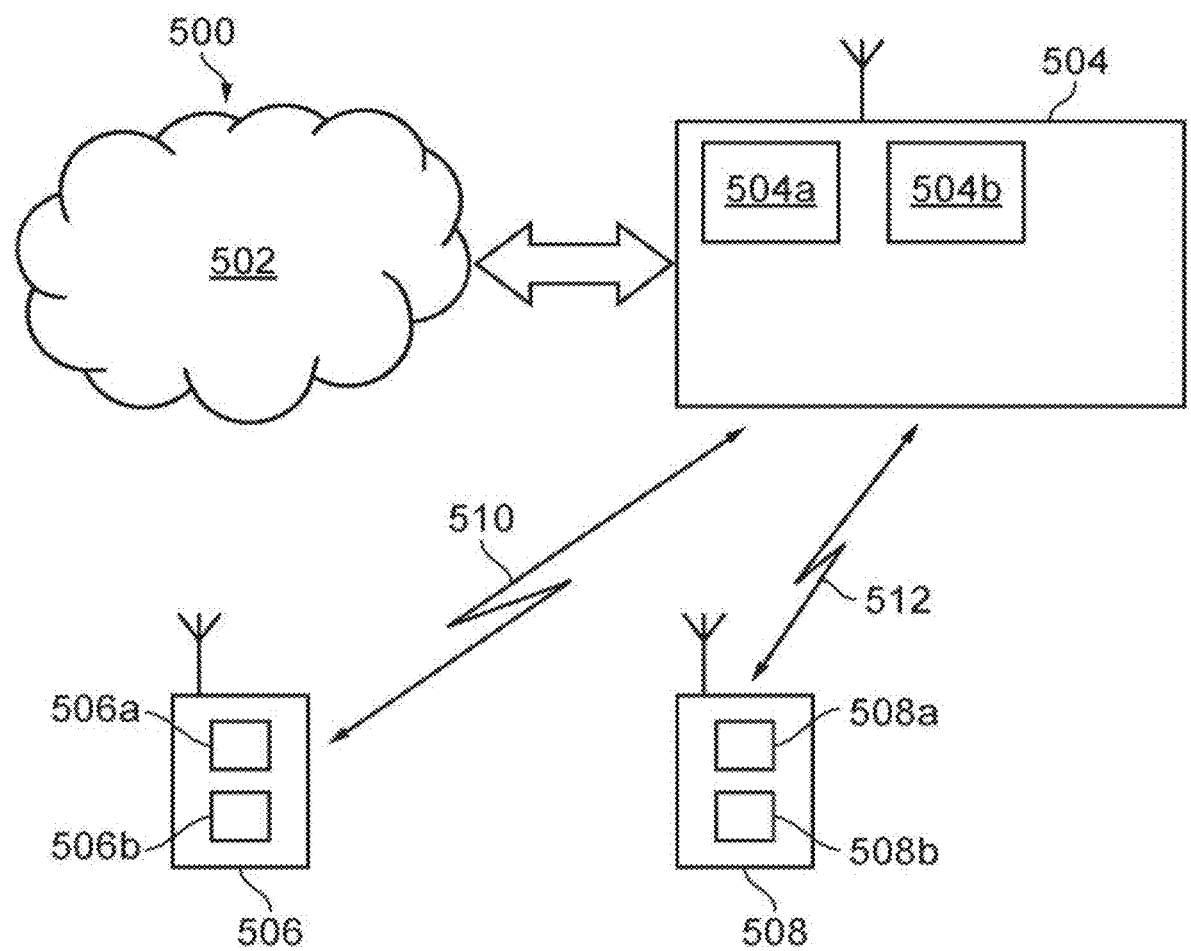
FIG. 6 schematically represents some aspects of a wireless telecommunication system in accordance with certain embodiments of the present disclosure.

FIG. 6 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 6 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service (EPS) connections with the terminal devices 506, 508 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 502 to an external packet data network, for example the Internet. As noted above, the operation of the various elements of the communications system 500 shown in FIG. 6 may be broadly conventional apart from where modified to provide functionality in accordance with embodiments of the present disclosure as discussed herein.

In this example, it is assumed the first terminal device 506 is a conventional smartphone-type terminal device communicating with the base station 504 in a conventional manner (i.e. the first terminal device is a legacy terminal device that does not rely on using narrowbands). It will be appreciated the first terminal device need not be a smartphone-type terminal device and could equally be another type of legacy terminal device, including a device that has the capability to support narrowband operation, but is currently not doing so. The conventional/legacy terminal device 506 comprises transceiver circuitry 506a (which may also be referred to as a transceiver/transceiver unit) for transmission and reception of wireless signals and processor circuitry 506b (which may also be referred to as a processor/processor unit) configured to control the device 506. The processor circuitry 506b may comprise various sub-units/sub-circuits for providing functionality as explained further herein. These sub-units may be implemented as discrete hardware elements or as appropriately configured functions of the processor circuitry. Thus the processor circuitry 506b may comprise circuitry which is suitably configured/programmed to provide the desired functionality using conventional programming/configuration techniques for equipment in wireless telecommunications systems. The transceiver circuitry 506a and the processor circuitry 506b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the legacy (non-narrowband) terminal device 506 will in general comprise various other elements associated with its operating functionality.

In this example, it is assumed the second terminal device 508 is a machine-type communication (MTC) terminal device 508 adapted to operate on a narrowband/restricted bandwidth (i.e. the second terminal device may be referred to as a narrowband terminal device/UE). However, it will be appreciated this represents merely one specific implementation of approaches in accordance with embodiments of the disclosure, and in other cases, the same principles may be applied in respect of terminal devices that support narrowband operation but which are not reduced capability MTC terminal devices, but may, for example, comprise smartphone terminal devices, or indeed any other form of terminal device, that may be operating in a wireless telecommunications system and which is configured to support narrowband operation (i.e. configured to communicate using only a restricted subset of the radio resources spanning the system frequency bandwidth). In this regard it will be appreciated that a narrowband terminal device may in some cases be able to be reconfigured to function as a non-narrowband/legacy terminal device.

The narrowband terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing desired functionality as explained further herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 6 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may comprise various sub-units/sub-circuits for providing desired functionality as explained further herein. These sub-units may be implemented as discrete hardware elements or as appropriately configured functions of the processor circuitry. Thus the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality.

Thus, the base station 504 is configured to communicate data with both the legacy terminal device 506 and the narrowband terminal device 508 according to an embodiment of the disclosure over respective communication links 510, 512. The base station 504 is configured to communicate with the legacy terminal device 506 over the associated radio communication link 510 and with the narrowband UE 508 over the associated radio communication link 512 generally following the established principles of LTE-based communications, apart from using modified procedures for configuring the frequency location for the narrowband communications over the radio communication link 512 between the base station and the narrowband UE 508 in accordance with certain embodiments of the present disclosure as described herein.

As noted above, in accordance with certain embodiments of the disclosure it is proposed to retain predefined locations for radio resources comprising one or more narrowband carriers and to provide a procedure for selectively moving/shifting the predefined locations in frequency, for example using RRC signalling/signals.

Thus, approaches in accordance with certain embodiments of the disclosure may involve methods of operating a terminal device and a network infrastructure equipment to communicate using a narrowband carrier supported within a wider system frequency bandwidth of a wireless telecommunications system. The terminal device and network infrastructure equipment establish initial frequencies for radio resources comprising a narrowband carrier. These may be established, for example, through being defined in an operating standard for the wireless telecommunications system, or in some cases the network infrastructure equipment may be configured to flexibly select the initial frequency location (i.e. initial frequencies for radio resources comprising the narrowband) for a narrowband and communicate an indication of this to the terminal device. Subsequently, when the network infrastructure equipment determines a need to configure the narrowband for use by the terminal device it establishes shifted frequencies for the radio resources comprising the narrowband carrier obtained by selecting a frequency shift to apply to the initial frequencies. The base station may be configured to do this in such a way as to (PRB) align the shifted narrowband location with resource block groups within the system bandwidth so that the narrowband impacts fewer resource block groups when located on the shifted frequencies as compared to when located on the initial (non-shifted) frequencies so as to help overcome the issue of blocked physical resource blocks discussed above. It will be appreciated the specific reason why the network infrastructure equipment determines a need to communicate with the terminal device using the narrowband and the information content of the communications on the narrowband are not significant to the principles discussed herein. The network infrastructure equipment then transmits configuration signalling to the terminal device to provide an indication of the frequency shift, e.g. using RRC signalling. The terminal device then establishes the shifted frequencies for the radio resources comprising the narrowband carrier by applying the indicated frequency shift to the initial frequencies. Thus, at this stage the terminal device and the network infrastructure equipment have both established the shifted frequency location and can proceed to communicate with each other using the radio resources for the narrowband carrier on the shifted frequencies.

In some examples the indication of the frequency shift may indicate a number of PRBs that should be shifted that applies for all narrowbands in the same direction. An example of this is shown in FIG. 7.

Figure 7:
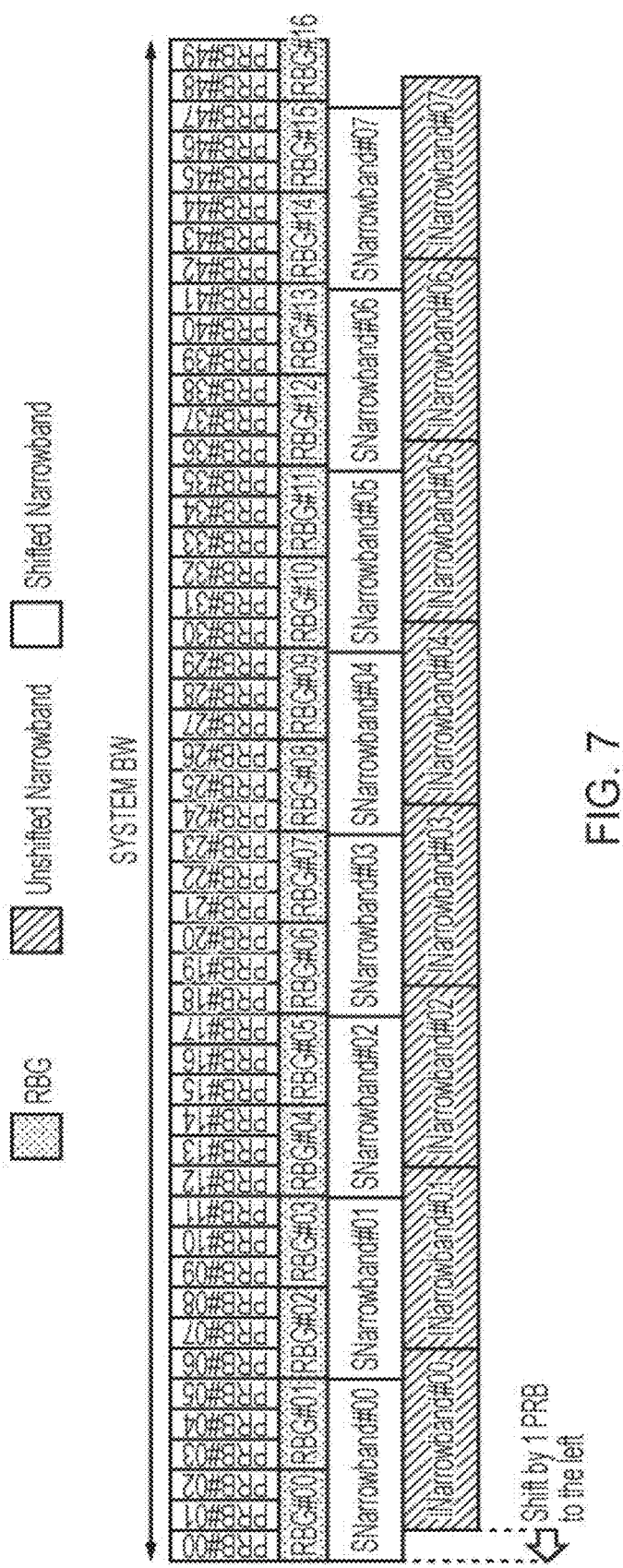
FIGS. 7 to 10 schematically represents arrangements of PRBs spanning a system BW and which are grouped into RBGs and which support a plurality of NB carriers in a wireless telecommunication system which are shifted in frequency relative to their predefined (unshifted) frequencies in accordance with certain embodiments of the present disclosure.

FIG. 7 is similar to, and will be understood from FIG. 5 and again shows a 10 MHz LTE system bandwidth BW divided into 50 physical resource blocks (PRB #00, PRB #01, . . . , PRB #49) which are grouped into 17 resource block groups (RBG #00, RBG #01, . . . , RBG #16) and also how the predefined initial (unshifted) locations for the 8 narrowbands (INarrowband #00, INarrowband #01, . . . , INarrowband #07) supported for this system bandwidth in LTE are arranged in frequency. As indicated by the legend, the unshifted locations for the narrowbands are shown in the bottom row of blocks in FIG. 7 (these unshifted locations correspond with the narrowband locations represented in FIG. 5). However, also shown in FIG. 7 are shifted locations for the narrowbands (labelled here as SNarrowband #00, SNarrowband #01, . . . , SNarrowband #07) in accordance with one example implementation of an embodiment of the disclosure. In particular, for this example the narrowbands are all shifted from their predefined initial locations by one PRB towards lower frequencies (i.e. to the left in FIG. 7, as shown by the arrow in the lower left of the figure). As indicated by the legend, the shifted locations for the narrowbands are shown in the second from bottom row of blocks in FIG. 7 (i.e. directly below the row representing the resource block groups). Thus, as can be seen in FIG. 7, the single PRB shift results in the boundaries for the narrowbands aligning with the boundaries between resource blocks groups, the effect of which is that each shifted narrowband is formed of physical resource blocks from a smaller number of resource block groups than the corresponding unshifted/initial narrowbands. For example, whereas the unshifted narrowband INarrowand #03 is on six physical resource blocks (PRB #19 to PRB #24) spread across three resource block groups (RBG #06 to RBG #08), the shifted narrowband SNarrowand #03 is on six physical resource blocks (PRB #18 to PRB #23) spread across only two resource block groups (RBG #06 and RBG #07), thereby avoiding the "blocked" physical resource blocks discussed above with reference to FIG. 5 when the third narrowband is scheduled and the surrounding narrowbands are not scheduled. It will be appreciated that while FIG. 7 shows one example application of a common frequency shift (one PRB to the left/lower frequency), different shifts may be used in different implementations. Different system bandwidths could also use shifts of different numbers of PRBs.

In some embodiments, an indicated frequency shift may be applicable to only a subset of the narrowbands (this subset may contain only one narrowband). This approach may be useful for a system bandwidth that has a PRB in the middle of the system bandwidth that is not allocated to support any of the narrowbands (e.g. in the case of a system bandwidth having an odd number of PRBs in an LTE context, such as shown in FIG. 2). Applying different shifts to different subsets of narrowbands allows more flexibility. An example is shown in FIG. 8.

Figure 8:
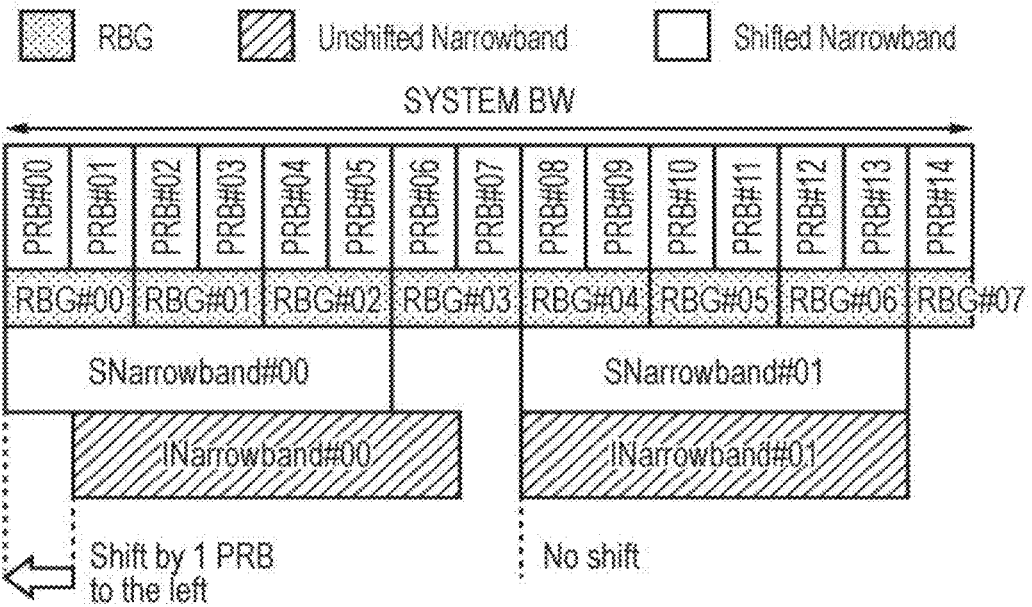

FIG. 8 is in general similar to, and will be understood from, FIG. 7, but shows an example implementation for a 3 MHz LTE bandwidth BW (as in FIG. 2), rather than the 10 MHz LTE bandwidth example of FIG. 7. Thus FIG. 8 shows a 3 MHz LTE system bandwidth BW divided into 15 physical resource blocks (PRB #00, PRB #01, . . . , PRB #14) which are grouped into 8 resource block groups (RBG #00, RBG #01, . . . , RBG #07). As indicated in Table 1, the RBG size for a 3 MHz channel bandwidth in LTE is 2 PRB, and so there are 7 RBGs comprising 2 PRBs with the last PRB forming its own RBG. FIG. 8 also shows how the predefined initial (unshifted) locations for the 2 narrowbands (INarrowband #00 and INarrowband #01) supported for this system bandwidth in LTE are arranged in frequency. As indicated by the legend, the unshifted locations for the narrowbands are shown in the bottom row of blocks in FIG. 8 (these unshifted locations correspond with the narrowband locations represented in FIG. 2). Also shown in FIG. 8 are shifted locations for the narrowbands (labelled here as SNarrowband #00 and SNarrowband #01) in accordance with one example implementation of an embodiment of the disclosure. In particular, for this example the lower frequency narrowband (left-most in the figure) is shifted by one PRB to the left/lower frequency (as shown by the arrow in the lower left of the figure) whereas the upper frequency narrowband (right-most in the figure) is not shifted (i.e. it is in effect shifted by zero PRBs, as shown by the arrow in the lower middle of the figure). As can be seen in FIG. 8, these shifts again result in the boundaries for the narrowbands aligning with the boundaries between resource blocks groups, the effect of which is that each shifted narrowband is formed of physical resource blocks from a smaller number of resource block groups than the corresponding unshifted/initial narrowbands. For example, whereas the unshifted narrowband INarrowand #00 is on six physical resource blocks (PRB #01 to PRB #06) spread across four resource block groups (RBG #00 to RBG #03), the shifted narrowband SNarrowand #03 is on six physical resource blocks (PRB #00 to PRB #05) spread across only three resource block groups (RBG #00 to RBG #02), thereby avoiding the "blocked" physical resource blocks effect discussed above.

The approach of FIG. 8 may thus be seen as applying different shifts to different groups/subsets of narrow bands. In this example there are two groups defined where Group 1 consists of Narrowband #00 and Group 2 consists of Narrowband #01. Group 1 is shifted by 1 PRB to the left whilst Group 2 is not shifted. This maintains the PRB gap in the middle of the system bandwidth while at the same time aligns the narrowband and the RBGs as discussed above. It will be appreciated it is not necessary to maintain a gap in the middle of the system bandwidth, as is done for the Example of FIG. 8, and an example where a gap is not maintained is shown in FIG. 9.

Figure 9:
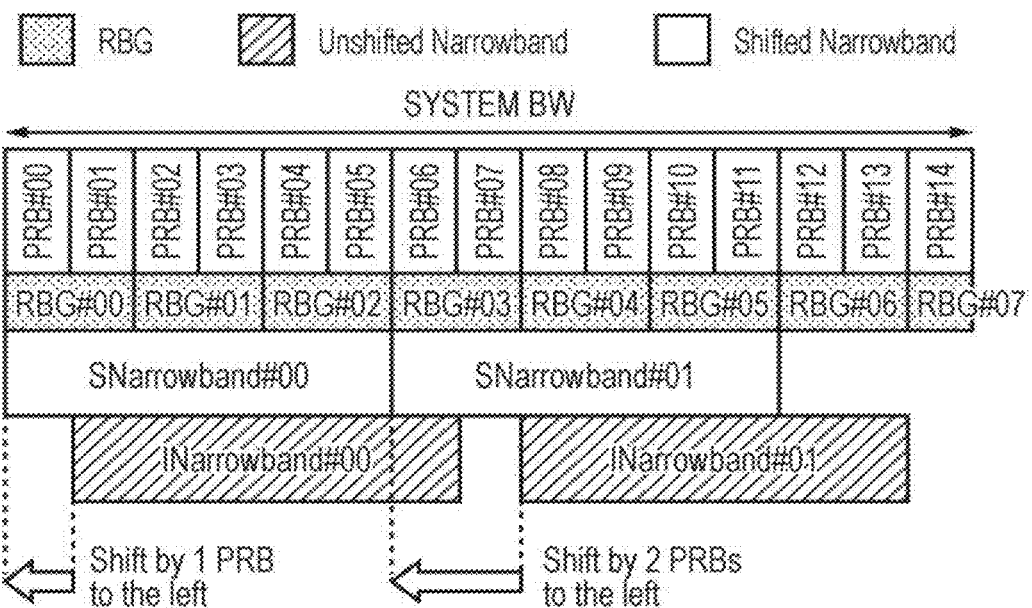

FIG. 9 is similar to, and will be understood from, FIG. 8, but shows an example implementation with a different frequency shift pattern for a 3 MHz LTE bandwidth. Thus FIG. 9 again shows a 3 MHz LTE system bandwidth BW divided into 15 physical resource blocks (PRB #00, PRB #01, . . . , PRB #14) which are grouped into 8 resource block groups (RBG #00, RBG #01, . . . , RBG #07). FIG. 9 again shows how the predefined initial (unshifted) locations for the 2 narrowbands (INarrowband #00 and INarrowband #01) supported for this system bandwidth in LTE are arranged in frequency. As indicated by the legend, the unshifted locations for the narrowbands are shown in the bottom row of blocks in FIG. 9. Also shown in FIG. 9 are shifted locations for the narrowbands (labelled here as SNarrowband #00 and SNarrowband #01) in accordance with one example implementation of an embodiment of the disclosure. In particular, for this example both narrowbands are shifted from their predefined initial locations in the same direction (in this case to the left/lower frequency), but the lower frequency narrowband is shifted by one PRB (as shown by the arrow in the lower left of the figure) whereas the upper frequency narrowband is shifted by two PRBs (as shown by the arrow in the lower middle of the figure). While this shift of the upper frequency narrowband by two PRBs does not, in this example, alter its relative alignment with the RBGs, it may nonetheless be desired for other reasons, for example to remove/reduce the gap between the narrowbands to increase the number of contiguous PRBs not used for narrowband operation.

The approach of FIG. 9 may thus again be seen as applying different shifts to different groups/subsets of narrow bands. In this example there are two groups defined where Group 1 consists of Narrowband #00 and Group 2 consists of Narrowband #01. Group 1 is shifted by 1 PRB to the left whilst Group 2 is shifted by 2 PRB to the left.

In some embodiments there may be a number of predefined frequency shift arrangements that can be indicated using an index for a predefined lookup table (e.g. defined by an operating standard of the system). Thus a network infrastructure equipment (eNB/base station) need only indicate the index to the lookup table in the signalling of the frequency shift configuration setting to the terminal device(s). An example lookup table is shown in Table 2 which has a single shift pattern defined for each system bandwidth. It will be appreciated that other combinations of shift pattern can be used, for example there can be more than one shift pattern per system bandwidth.

TABLE 2

| Index | System Bandwidth MHz (#PRB) | Shift Pattern |
| --- | --- | --- |
| 0 | 1.4 MHz (6 PRB) | No shift |
| 1 | 3 MHz (15 PRB) | Shift Narrowband#00 1 PRB to the left & do not shift Narrowband#01 |
| 2 | 5 MHz (25 PRB) | Shift Narrowband#02 & Narrowband#03 1 PRB to the left |
| 3 | 10 MHz (50 PRB) | Shift all narrowbands 1 PRB to the left |
| 4 | 15 MHz (75 PRB) | Shift Narrowbands#00 till Narrowbands#05 1 PRB to the left & shift Narrowbands#06 till Narrowbands#11 2 PRBs to the left |
| 5 | 20 MHz (100 PRB) | No Shift |

In an example where a lookup table for the shift pattern is used and each system bandwidth is mapped to one shift pattern, the network infrastructure equipment could instead simply signal a single bit indication to indicate whether shifting is applied or not, and the UE can derive the pattern to apply from the table (having determined the system bandwidth separately, e.g. from master information block, MIB, signalling in an LTE context.

In some cases a frequency shift/frequency shift pattern may be signalled to a UE in accordance with the principles described above, and then a separate indication may be provided to the UE to indicate whether or not to apply the previously indicated shift in respect of individual resource allocations, for example by an indicator in downlink control information, DCI, signalling carrying a downlink or uplink grant to the UE. That is to say, the shift in narrowband(s) may be dynamically indicated to the UE. This may in some cases be helpful in a system that supports both narrowband devices that can support frequency shifting as discussed herein and narrowband devices that cannot support frequency shifting as discussed herein. Thus when multiplexing both types of narrowband device (i.e. frequency-shift-supporting devices and non-frequency-shift-supporting devices) in a subframe on the same narrowband, the frequency shifting can be deactivated, and when multiplexing shift-capable narrowband devices and full bandwidth legacy devices at the same time the frequency shifting can be activated. Furthermore, this approach can allow for shift patterns in which different narrowbands overlap in their shifted locations, and if narrowbands that overlap in their shifted positons are to be scheduled for active use at the same time, the scheduling signalling (DCI) can indicate the shift is applied for one narrowband but not another to avoid the overlap when the narrowbands are active at the same time. For example, in an example similar to that shown in FIG. 9, the left-hand narrowband could be shifted one PRB to the right (rather than to the left as in FIG. 9), and the right-hand narrowband could be shifted two PRBs to the left (as in FIG. 9) resulting in these two shifted narrowbands overlapping in PRB #06 and PRB #07. However, since the shift can be applied dynamically, e.g. using DCI, the eNB can indicate a shift for one narrowband and not the other when both are scheduled for use at the same time. In some examples the DCI may indicate the shift without prior RRC configuration of the shift pattern. That is to say the DCI may tell the UE which direction and by how many PRBs to shift the narrowband for the corresponding allocation. In some examples the DCI may contain 1 bit that can be set as a flag to indicate whether to shift the scheduled narrowband such that it aligns to the nearest RBG or to align to a legacy MTC narrowband location (i.e. not perform any shift to the narrowband). An example of overlapping shifted narrowbands is shown in FIG. 10.

Figure 10:
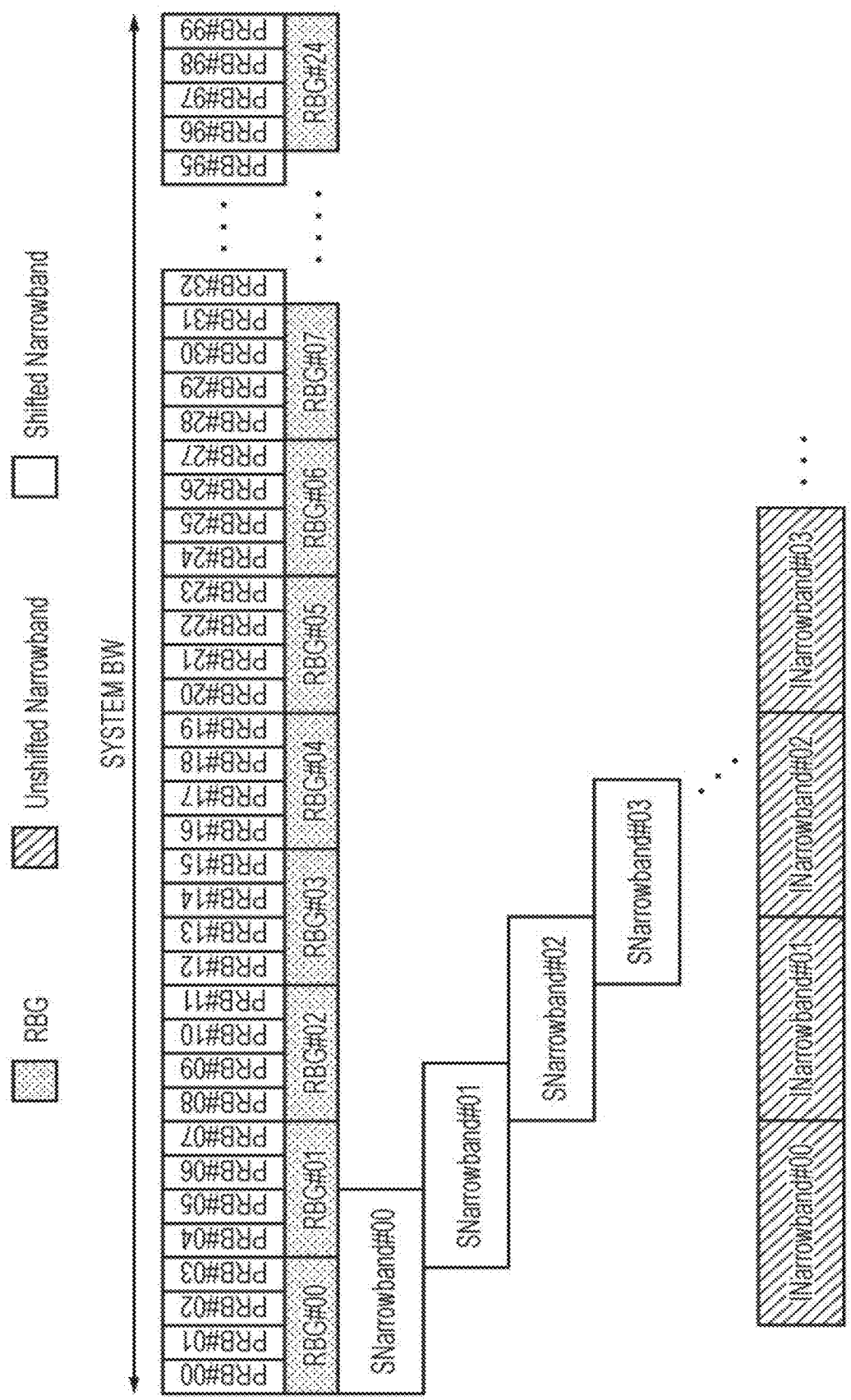

FIG. 10 is similar to, and will be understood from, FIG. 8, but shows an example implementation with an overlapping frequency shift pattern for a 20 MHz LTE bandwidth. Thus FIG. 10 shows a 20 MHz LTE system bandwidth BW divided into 100 physical resource blocks (PRB #00, PRB #01, . . . , PRB #99) which are grouped into 25 resource block groups (RBG #00, RBG #01, . . . , RBG #24). FIG. 10 also shows how the predefined initial (unshifted) locations for four of the sixteen narrowbands (labelled INarrowband #00 to INarrowband #03) supported for this system bandwidth in LTE are arranged in frequency. As indicated by the legend, the unshifted locations for the narrowbands are shown in the bottom row of blocks in FIG. 10. Also shown in FIG. 8 are shifted locations for these four narrowbands (labelled here as SNarrowband #00 to SNarrowband #03) in accordance with one example implementation of an embodiment of the disclosure. In particular, for this example the lower frequency narrowband (left-most in the figure) is shifted by two PRBs to the left/lower frequency. The next lowest frequency narrowband (next left-most in the figure) is shifted by four PRBs to the left/lower frequency. The next narrowband is shifted by 6 PRBs, the next by 8 PRBs, and so on. To avoid using overlapping narrowbands at the same time, the network can dynamically indicate whether to apply the shift, e.g. in DCI, for each resource allocation.

In some examples, during a random access procedure, unshifted narrowbands may be used. This can in some cases be helpful if during the initial stages of the random access procedure, the eNB does not know the capability of the UE (e.g. whether it implements the narrowband shifting feature or not). Hence during the random access procedure, until the UE transmits its capability to the eNB to indicate it can operate using shifted frequencies, unshifted narrowbands may be used. After the random access procedure when the eNB (network infrastructure equipment) is aware the UE supports the feature, narrowband shifting may be employed according to whether narrowband shifting is activated or not in either SIB signalling or UE-specific RRC signalling.

In some cases, the PRACH (physical random access channel) preamble space (i.e. the set of available PRACH preambles) may be partitioned. One partition (partition 1) may be used for UEs that are capable of applying narrowband shifting and another partition (partition 2) may be reserved for UEs that are not capable of applying narrowband shifting. The PRACH partitions may, for example, be defined by an operating standard or signalled via SIB. A UE that is capable of narrowband shifting thus uses a PRACH preamble from partition 1 and then decodes a response (e.g.

RAR in an LTE context) that can be narrowband shifted in accordance with the principles described herein.

Figure 11:
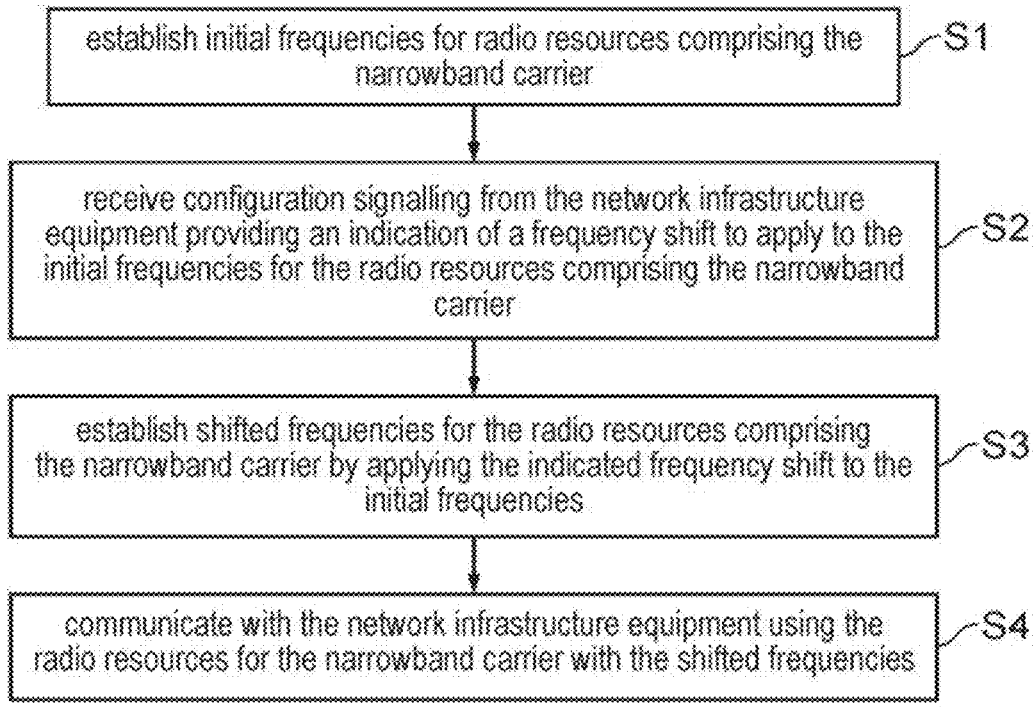
FIG. 11 is a flow chart schematically representing some operating aspects of a base station (network infrastructure equipment) in accordance with certain embodiments of the disclosure.

FIG. 11 is a flow diagram schematically representing a method of operating a terminal device to communicate with a network infrastructure equipment in a wireless telecommunications system using radio resources comprising a narrowband carrier supported within a wider system frequency bandwidth of the wireless telecommunications system in accordance with the principles discussed herein. In a first step S1 of the process represented in FIG. 11 the terminal device establishes initial frequencies for radio resources comprising the narrowband carrier. In a second step S2 of the process represented in FIG. 11 the terminal device receives configuration signalling from the network infrastructure equipment providing an indication of a frequency shift to apply to the initial frequencies for the radio resources comprising the narrowband carrier. In a third step S3 of the process represented in FIG. 11 the terminal device establishes shifted frequencies for the radio resources comprising the narrowband carrier by applying the indicated frequency shift to the initial frequencies. In a fourth step S4 of the process represented in FIG. 11 the terminal device communicates with the network infrastructure equipment using the radio resources for the narrowband carrier with the shifted frequencies.

Figure 12:
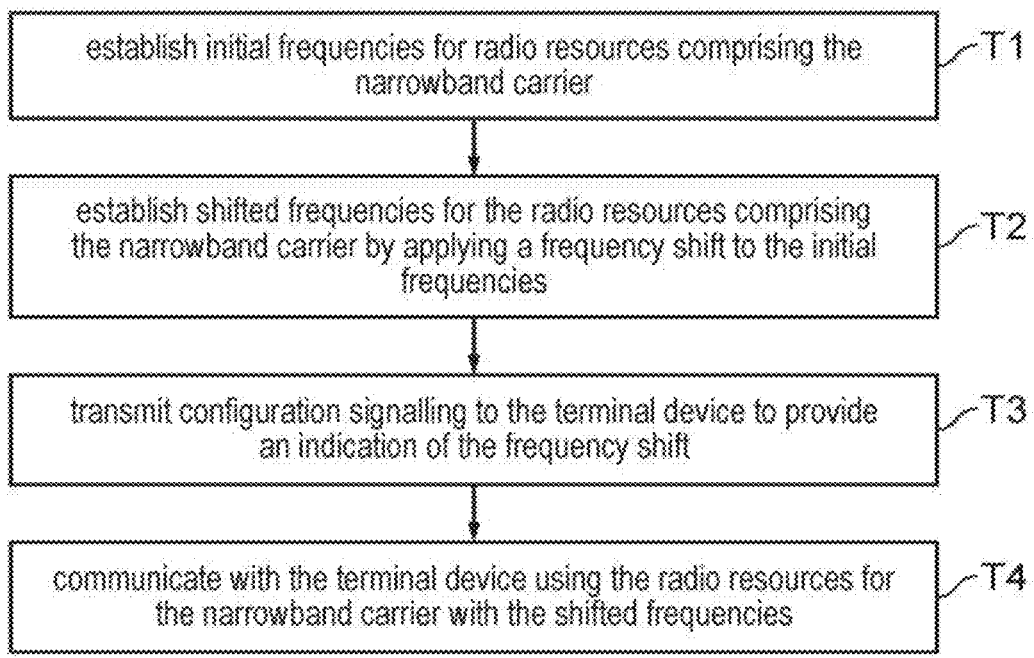
FIG. 12 is a flow chart schematically representing some operating aspects of a terminal device (UE) in accordance with certain embodiments of the disclosure.

FIG. 12 is a flow diagram schematically representing a method of operating a network infrastructure equipment (base station) to communicate with a terminal device in a wireless telecommunications system using radio resources comprising a narrowband carrier supported within a wider system frequency bandwidth of the wireless telecommunications system in accordance with the principles discussed herein. In a first step T1 of the process represented in FIG. 12 the network infrastructure equipment establishes initial frequencies for radio resources comprising the narrowband carrier. In a second step T2 of the process represented in FIG. 12 the network infrastructure equipment establishes shifted frequencies for the radio resources comprising the narrowband carrier by applying a frequency shift to the initial frequencies. In a third step T3 of the process represented in FIG. 12 the network infrastructure equipment transmits configuration signalling to the terminal device to provide an indication of the frequency shift. In a fourth step T4 of the process represented in FIG. 12 the network infrastructure equipment communicates with the terminal device using the radio resources for the narrowband carrier with the shifted frequencies.

As discussed herein, the shift may be such that at least one boundary of one narrowband is shifted into alignment with at least one boundary between two RBGs, and more generally, the shift may be such that the radio resources (PRBs) for at least one narrowband carrier span a smaller number of the predefined groups of physical resource blocks (RBGs) for the shifted frequencies than for the initial frequencies. That is to say, the shift may be such that use of the narrowband carrier "blocks" fewer RBGs for its frequency shifted location than for its nominal predefined (initial) location before shifting.

There are various ways in which the various frequency shifts discussed herein may be communicated to terminal devices. For example, in one approach an indication of shifts in both magnitude and direction may be provided for each narrowband. However, in other examples the indication of the frequency shift may comprise only an indication of a common magnitude which the terminal device is configured to apply to all narrowbands, with the direction of the shifts being dependent on the initial predefined location of the narrowband within the system bandwidth, and for example depending on whether the narrowband is in the upper or lower half of the system bandwidth. More generally, for all the examples described herein there are various different ways in which the direction and magnitude of the shift of the different narrowband can be indicated in signalling from the network infrastructure equipment to the terminal device and the most appropriate way may depend on the shifts being indicated. For example, if the shifts are the same for all narrowbands, it may be most efficient for the indication to comprise a single value/direction that the terminal device is configured to apply for all narrowbands, whereas if the shifts are different for different narrowbands/groups of narrowband, the indication may comprise multiple frequency shift values/directions that the terminal device is configured to apply for the corresponding narrowbands. In examples where the potential frequency shifts are limited to a number of predefined alternatives, the indication may comprise an index pointing to the relevant shift pattern, e.g. in the manner of a lookup table. Indeed, in some examples the direction and magnitude of the shift of the different narrowbands may be defined in an operating standard of the wireless telecommunications system, and the signalling indicating the frequency shift may simply comprise an indication of whether or not to apply the frequency shift.

Thus there has been described a method of operating a terminal device to communicate with a network infrastructure equipment in a wireless telecommunications system using radio resources comprising a narrowband carrier supported within a wider system frequency bandwidth of the wireless telecommunications system, wherein the method comprises: establishing initial frequencies for radio resources comprising the narrowband carrier; receiving configuration signalling from the network infrastructure equipment providing an indication of a frequency shift to apply to the initial frequencies for the radio resources comprising the narrowband carrier; establishing shifted frequencies for the radio resources for the narrowband carrier by applying the indicated frequency shift to the initial frequencies; and communicating with the network infrastructure equipment using the shifted frequencies for the radio resources for the narrowband carrier. A terminal device and circuitry configured to implement this method have also been described.

There has also been described a method of operating a network infrastructure equipment to communicate with a terminal device in a wireless telecommunications system using radio resources comprising a narrowband carrier supported within a wider system frequency bandwidth of the wireless telecommunications system, wherein the method comprises: establishing initial frequencies for radio resources comprising the narrowband carrier; establishing shifted frequencies for the radio resources comprising the narrowband carrier by applying a frequency shift to the initial frequencies; transmitting configuration signalling to the terminal device to provide an indication of the frequency shift; and communicating with the terminal device using the radio resources for the narrowband carrier with the shifted frequencies. A network infrastructure equipment and circuitry configured to implement this method have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/ predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored on a SIM card. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices, but can be applied more generally, for example in respect of any type terminal device operating on a narrowband within a broader/wider system bandwidth.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device to communicate with a network infrastructure equipment in a wireless telecommunications system using radio resources comprising a narrowband carrier supported within a wider system frequency bandwidth of the wireless telecommunications system, wherein the method comprises: establishing initial frequencies for radio resources comprising the narrowband carrier; receiving configuration signalling from the network infrastructure equipment providing an indication of a frequency shift to apply to the initial frequencies for the radio resources comprising the narrowband carrier; establishing shifted frequencies for the radio resources comprising the narrowband carrier by applying the indicated frequency shift to the initial frequencies; and communicating with the network infrastructure equipment using the radio resources for the narrowband carrier with the shifted frequencies.

Paragraph 2. The method of paragraph 1, wherein the indication of the frequency shift to apply to the initial frequencies comprises an indication of a magnitude and/or direction of the frequency shift.

Paragraph 3. The method of paragraph 2, wherein the indication of the frequency shift to apply to the initial frequencies comprises an indication of a magnitude of the frequency shift and the method further comprises determining a direction for the frequency shift based on a location of the initial frequencies within the system frequency bandwidth.

Paragraph 4. The method of any of paragraphs 1 to 3, wherein the indication of the frequency shift to apply to the initial frequencies comprises an indication of whether or not to apply a predefined frequency shift to the initial frequencies.

Paragraph 5. The method of any of paragraphs 1 to 4, wherein the terminal device determines a magnitude and/or direction of the frequency shift from the indication of a frequency shift in the configuration signalling by taking account of a magnitude for the system frequency bandwidth.

Paragraph 6. The method of any of paragraphs 1 to 5, wherein the indication of whether or not to apply a predefined frequency shift to the initial frequencies is provided in downlink control information, DCI.

Paragraph 7. The method of any of paragraphs 1 to 6, wherein the indication of the frequency shift comprises an indication of a selected one of a plurality of predefined potential frequency shifts.

Paragraph 8. The method of any of paragraphs 1 to 7, wherein the indication of the frequency shift is received by the terminal device using radio resource control, RRC, signalling.

Paragraph 9. The method of any of paragraphs 1 to 8, wherein the indication of the frequency shift is received by the terminal device in system information in a system information block, SIB.

Paragraph 10. The method of any of paragraphs 1 to 8, wherein the indication of the frequency shift is received by the terminal device using terminal device specific signalling.

Paragraph 11. The method of any of paragraphs 1 to 10, wherein the system frequency bandwidth of the wireless telecommunications system is divided into a plurality of predefined groups of physical resource blocks which are scheduled together for terminal devices using the system frequency bandwidth, wherein the frequency shift is such that a relative alignment between the narrowband carrier and the predefined groups of physical resources changes so that radio resources for the narrowband carrier span a smaller number of the predefined groups of physical resource blocks for the shifted frequencies than for the initial frequencies.

Paragraph 12. The method of any of paragraphs 1 to 11, further comprising communicating with the network infrastructure equipment using the initial frequencies for the radio resources for the narrowband carrier to establish a radio connection with the network infrastructure equipment prior to communicating with the network infrastructure equipment using the shifted frequencies for the radio resources for the narrowband carrier.

Paragraph 13. The method of paragraph 12, wherein the procedure to establish a radio connection with the network infrastructure equipment involves the terminal device transmitting a random access preamble to the network infrastructure equipment, and wherein the random access preamble is selected by the terminal device from a subset of available random access preambles defined for use by terminal devices to provide the network infrastructure equipment with an indication of an ability to communicate with the network infrastructure equipment using the shifted frequencies for the radio resources for the narrowband carrier.

Paragraph 14. The method of any of paragraphs 1 to 13, wherein the narrowband carrier is one of a plurality of narrowband carriers supported within the wider system frequency bandwidth of the wireless telecommunications system, and wherein the configuration signalling received from the network infrastructure equipment provides an indication of a frequency shift for each of the narrowband carriers.

Paragraph 15. The method of paragraph 14, wherein the frequency shift has the same magnitude for each of the narrowband carriers.

Paragraph 16. The method of paragraph 14, wherein the frequency shift for a first group of the narrowband carriers and the frequency shift for a second group of the narrowband carriers have different magnitudes.

Paragraph 17. The method of paragraph 16, wherein a magnitude for the frequency shift for one of the first and second groups of the narrowband carriers is zero.

Paragraph 18. The method of paragraph 14, wherein the frequency shift for a first group of the narrowband carriers and the frequency shift for a second group of the narrowband carriers are in different directions.

Paragraph 19. The method of any of paragraphs 14 to 18, wherein the frequency shift for at least two of the narrowbands causes the narrowbands to overlap in frequency when the frequency shift is applied.

Paragraph 20. A terminal device for communicating with a network infrastructure equipment in a wireless telecommunications system using radio resources comprising a narrowband carrier supported within a wider system frequency bandwidth of the wireless telecommunications system, wherein the terminal device comprises controller circuitry and transceiver circuitry configured such that the terminal device is operable to: establish initial frequencies for radio resources comprising the narrowband carrier; receive configuration signalling from the network infrastructure equipment providing an indication of a frequency shift to apply to the initial frequencies for the radio resources comprising the narrowband carrier; establish shifted frequencies for the radio resources comprising the narrowband carrier by applying the indicated frequency shift to the initial frequencies; and communicate with the network infrastructure equipment using the radio resources for the narrowband carrier with the shifted frequencies.

Paragraph 21. Integrated circuitry for a terminal device for communicating with a network infrastructure equipment in a wireless telecommunications system using radio resources comprising a narrowband carrier supported within a wider system frequency bandwidth of the wireless telecommunications system, wherein the integrated circuitry comprises controller circuitry and transceiver circuitry configured to operate together such that the terminal device is operable to: establish initial frequencies for radio resources comprising the narrowband carrier; receive configuration signalling from the network infrastructure equipment providing an indication of a frequency shift to apply to the initial frequencies for the radio resources comprising the narrowband carrier; establish shifted frequencies for the radio resources comprising the narrowband carrier by applying the indicated frequency shift to the initial frequencies; and communicate with the network infrastructure equipment using the radio resources for the narrowband carrier with the shifted frequencies.

Paragraph 22. A method of operating a network infrastructure equipment to communicate with a terminal device in a wireless telecommunications system using radio resources comprising a narrowband carrier supported within a wider system frequency bandwidth of the wireless telecommunications system, wherein the method comprises: establishing initial frequencies for radio resources comprising the narrowband carrier; establishing shifted frequencies for the radio resources comprising the narrowband carrier by applying a frequency shift to the initial frequencies; transmitting configuration signalling to the terminal device to provide an indication of the frequency shift; and communicating with the terminal device using the radio resources for the narrowband carrier with the shifted frequencies.

Paragraph 23. A network infrastructure equipment for communicating with a terminal device in a wireless telecommunications system using radio resources comprising a narrowband carrier supported within a wider system frequency bandwidth of the wireless telecommunications system, wherein the network infrastructure equipment comprises controller circuitry and transceiver circuitry configured such that the network infrastructure equipment is operable to: establish initial frequencies for radio resources comprising the narrowband carrier; establish shifted frequencies for the radio resources comprising the narrowband carrier by applying a frequency shift to the initial frequencies; transmit configuration signalling to the terminal device to provide an indication of the frequency shift; and communicate with the terminal device using the radio resources for the narrowband carrier with the shifted frequencies.

Paragraph 24. Integrated circuitry for a network infrastructure equipment for communicating with a terminal device in a wireless telecommunications system using radio resources comprising a narrowband carrier supported within a wider system frequency bandwidth of the wireless telecommunications system, wherein the integrated circuitry comprises controller circuitry and transceiver circuitry configured to operate together such that the terminal device is operable to: establish initial frequencies for radio resources comprising the narrowband carrier; establish shifted frequencies for the radio resources comprising the narrowband carrier by applying a frequency shift to the initial frequencies; transmit configuration signalling to the terminal device to provide an indication of the frequency shift; and communicate with the terminal device using the radio resources for the narrowband carrier with the shifted frequencies.

REFERENCES

[1] RP-161464, "Revised WID for Further Enhanced MTC for LTE", Ericsson, 3GPP TSG RAN Meeting #73, New Orleans, USA, Sep. 19-22, 2016

[2] RP-161901, "Revised work item proposal: Enhancements of NB-IoT", Huawei, HiSilicon, 3GPP TSG RAN Meeting #73, New Orleans, USA, Sep. 19-22, 2016

[3] RP-170732, "New WID on Even further enhanced MTC for LTE", Ericsson, Qualcomm, 3GPP TSG RAN Meeting #75, Dubrovnik, Croatia, Mar. 6-9, 2017

[4] RP-170852, "New WID on Further NB-IoT enhancements", Huawei, HiSilicon, Neul, 3GPP TSG RAN Meeting #75, Dubrovnik, Croatia, Mar. 6-9, 2017

[5] Holma H. and Toskala A, "LTE for UMTS OFDMA and SC-FDMA based radio access", John Wiley and Sons, 2009

[6] R1-1720541, "On the interest of more flexible resource allocation for efeMTC", Orange, 3GPP TSG RAN WG1 Meeting #91, Reno, Nevada USA, November 27-Dec. 1, 2017

The invention claimed is:

1. Integrated circuitry for a terminal device the integrated circuitry comprising:
controller circuitry and transceiver circuitry configured to operate together to:
establish initial frequencies for communicating with a network infrastructure equipment using radio resources, wherein the radio resources include narrowband carriers that are supported within a system frequency bandwidth, and the system frequency bandwidth is divided by a plurality of predefined groups of physical resource blocks;
receive, from the network infrastructure equipment, configuration signalling providing an indication of a frequency shift to apply to the initial frequencies for;
establish shifted frequencies for the radio resources by applying the indicated frequency shift to the initial frequencies; and
communicate with the network infrastructure equipment using the radio resources with the shifted frequencies, wherein
the frequency shift is such that boundaries of the narrowband carriers align with boundaries between the plurality of predefined groups of physical resource blocks, and
the frequency shift for a first group of the narrowband carriers and the frequency shift for a second group of the narrowband carriers have different magnitudes.

2. The integrated circuitry of claim 1, wherein the indication comprises an indication of a magnitude and/or a direction of the frequency shift.

3. The integrated circuitry of claim 2, wherein
the indication comprises an indication of the magnitude of the frequency shift, and
the controller circuitry and the transceiver circuitry are configured to operate together to determine the direction for the frequency shift based on a location of the initial frequencies within the system frequency bandwidth.

4. The integrated circuitry of claim 1, wherein the indication comprises an indication of whether or not to apply a predefined frequency shift to the initial frequencies.

5. The integrated circuitry of claim 1, wherein the controller circuitry and the transceiver circuitry are configured to operate together to determine a magnitude and/or a direction of the frequency shift from the indication in the configuration signalling based on a magnitude for the system frequency bandwidth.

6. The integrated circuitry of claim 1, wherein the indication indicates whether or not to apply a predefined frequency shift to the initial frequencies, and is provided in downlink control information, DCI.

7. The integrated circuitry of claim 1, wherein the indication comprises an indication of a selected one of a plurality of predefined potential frequency shifts.

8. The integrated circuitry of claim 1, wherein the indication is received using radio resource control, RRC, signalling.

9. The integrated circuitry of claim 1, wherein the indication is received in system information in a system information block, SIB.

10. The integrated circuitry of claim 1, wherein the indication is received using terminal device specific signalling.

11. The integrated circuitry of claim 1, wherein
the plurality of predefined groups of physical resource blocks are scheduled together for terminal devices using the system frequency bandwidth, and
the frequency shift is such that a relative alignment between a narrowband carrier and the plurality of predefined groups of physical resource blocks changes so that radio resources for the narrowband carrier span a smaller number of the plurality of predefined groups of physical resource blocks for the shifted frequencies than for the initial frequencies.

12. The integrated circuitry of claim 1, wherein the controller circuitry and the transceiver circuitry are configured to operate together to communicate with the network infrastructure equipment using the initial frequencies for the radio resources to establish a radio connection with the network infrastructure equipment prior to communicating with the network infrastructure equipment using the shifted frequencies for the radio resources.

13. The integrated circuitry of claim 12, wherein
a procedure to establish the radio connection with the network infrastructure equipment includes the terminal device transmitting a random access preamble to the network infrastructure equipment, and
the random access preamble is selected by the terminal device from a subset of available random access preambles for use by terminal devices to provide the network infrastructure equipment with an indication of an ability to communicate with the network infrastructure equipment using the shifted frequencies for the radio resources.

14. The integrated circuitry of claim 1, wherein the configuration signalling provides an indication of a frequency shift for each narrowband carrier of the narrowband carriers.

15. The integrated circuitry of claim 1, wherein a magnitude of the frequency shift for one of the first and second groups of the narrowband carriers is zero.

16. The integrated circuitry of claim 14, wherein the frequency shift for the first group of the narrowband carriers and the frequency shift for the second group of the narrowband carriers are in different directions.

17. A method of operating a network infrastructure equipment, the method comprising:
establishing initial frequencies for communicating with a terminal device using radio resources, wherein the radio resources include narrowband carriers that are supported within a system frequency bandwidth, and the system frequency bandwidth is divided by a plurality of predefined groups of physical resource blocks;
establishing shifted frequencies for the radio resources by applying a frequency shift to the initial frequencies;
transmitting configuration signalling to the terminal device to provide an indication of the frequency shift; and communicating with the terminal device using the radio resources with the shifted frequencies, wherein the frequency shift is such that boundaries of the narrowband carriers align with boundaries between the plurality of predefined groups of physical resource blocks, and the frequency shift for a first group of the narrowband carriers and the frequency shift for a second group of the narrowband carriers have different magnitudes.

18. Integrated circuitry for a network infrastructure equipment, the integrated circuitry comprising:

controller circuitry and transceiver circuitry configured to operate together to:

establish initial frequencies for communicating with a terminal device using radio resources, wherein the radio resources include narrowband carriers that are supported within a system frequency bandwidth, and the system frequency bandwidth is divided by a plurality of predefined groups of physical resource blocks;

establish shifted frequencies for the radio resources by applying a frequency shift to the initial frequencies;

transmit configuration signalling to the terminal device to provide an indication of the frequency shift; and communicate with the terminal device using the radio resources with the shifted frequencies, wherein the frequency shift is such that boundaries of the narrowband carriers align with boundaries between the plurality of predefined groups of physical resource blocks, and the frequency shift for a first group of the narrowband carriers and the frequency shift for a second group of the narrowband carriers have different magnitudes.

* * * * *